US011341030B2

(12) United States Patent
Christen

(10) Patent No.: US 11,341,030 B2
(45) Date of Patent: May 24, 2022

(54) SCRIPTLESS SOFTWARE TEST AUTOMATION

(71) Applicant: SAP SE, Walldorf (DE)

(72) Inventor: Dirk Christen, Harthausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/143,861

(22) Filed: Sep. 27, 2018

(65) Prior Publication Data

US 2020/0104244 A1     Apr. 2, 2020

(51) Int. Cl.
*G06F 11/36*     (2006.01)
*G06F 11/07*     (2006.01)

(52) U.S. Cl.
CPC ...... *G06F 11/3688* (2013.01); *G06F 11/0787* (2013.01); *G06F 11/3664* (2013.01); *G06F 11/3684* (2013.01); *G06F 11/3692* (2013.01); *G06F 2201/835* (2013.01); *G06F 2201/86* (2013.01)

(58) Field of Classification Search
CPC ............ G06F 11/3688; G06F 11/0787; G06F 11/3664; G06F 11/3684; G06F 11/3692; G06F 2201/835; G06F 2201/86; G06F 11/3636

See application file for complete search history.

(56) References Cited

U.S. PATENT DOCUMENTS

| | | | | |
|---|---|---|---|---|
| 7,165,191 B1* | 1/2007 | Vakrat | ..................... | G06F 11/26 714/38.1 |
| 8,826,084 B1* | 9/2014 | Gauf | .................... | G06F 11/3688 714/32 |
| 9,787,534 B1* | 10/2017 | Kadosh | .................. | H04L 41/069 |
| 2008/0243463 A1* | 10/2008 | Lovas | .................... | G06Q 10/04 703/17 |
| 2010/0162050 A1* | 6/2010 | Cathro | ................ | G06F 11/3476 714/44 |
| 2010/0180260 A1* | 7/2010 | Chikkadevaiah | ... | G06F 11/3664 717/125 |
| 2010/0287209 A1* | 11/2010 | Hauser | ................... | G06F 17/243 707/803 |
| 2011/0173239 A1* | 7/2011 | Sayed | .................. | G06F 11/3414 718/1 |
| 2012/0198476 A1* | 8/2012 | Markuza | ............. | G06F 11/3414 719/318 |
| 2013/0024760 A1* | 1/2013 | Vogel | ...................... | G06F 9/451 715/212 |

(Continued)

*Primary Examiner* — Chat C Do
*Assistant Examiner* — Noor Alkhateeb
(74) *Attorney, Agent, or Firm* — Buckley, Maschoff & Talwalkar LLC

(57) ABSTRACT

Provided is a system and method for generating an internal automated test for testing a software application. In one example, the method may include one or more of storing, via an application persistency, a plurality of application events that occur during a reference execution of an application, retrieving the plurality of application events of the reference execution of the application and timestamps indicating respective times when the plurality of application events occurred, from the application persistency, and in response to receiving a request to test the application, executing a recreation of the plurality of application events in an order based on the timestamps to perform an automated test of the application.

17 Claims, 7 Drawing Sheets

(56) References Cited

U.S. PATENT DOCUMENTS

| | | | |
|---|---|---|---|
| 2013/0074051 A1* | 3/2013 | Freeman | G06F 11/3438 |
| | | | 717/130 |
| 2014/0132571 A1* | 5/2014 | Zeng | G06F 11/3688 |
| | | | 345/178 |
| 2014/0157288 A1* | 6/2014 | Wong | G06F 11/3065 |
| | | | 719/318 |
| 2018/0173617 A1* | 6/2018 | Tian | G06F 11/3692 |
| 2018/0203844 A1* | 7/2018 | Greer | G06F 11/3688 |
| 2018/0300375 A1* | 10/2018 | Pant | G06F 16/24565 |
| 2018/0364942 A1* | 12/2018 | Goren | G06F 3/061 |
| 2019/0289058 A1* | 9/2019 | Bhoj | H04L 67/18 |
| 2019/0294734 A1* | 9/2019 | Beringer | G06F 16/903 |

\* cited by examiner

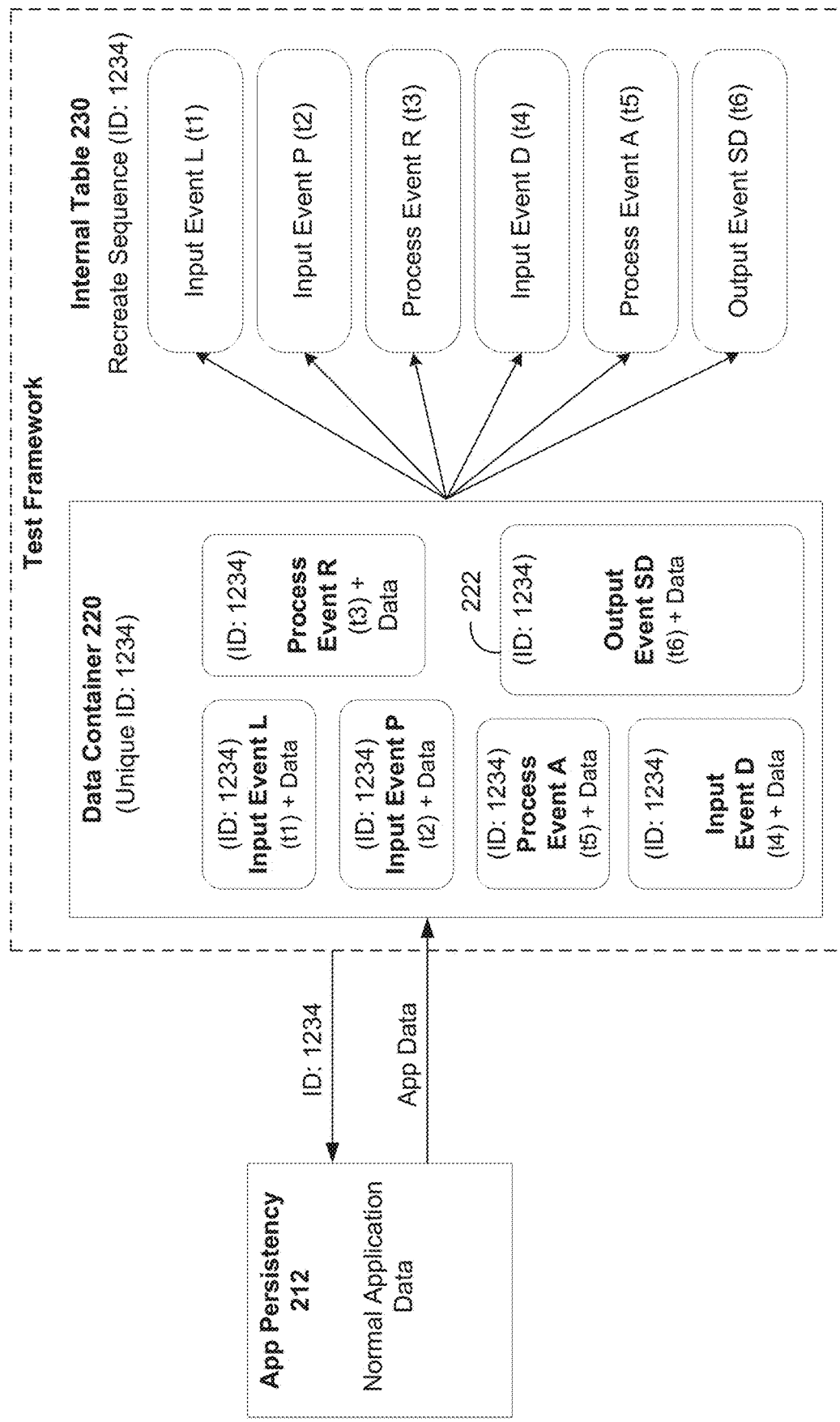

SCRIPTLESS SOFTWARE TEST AUTOMATION

BACKGROUND

Software testing ensures that a software program is bug free and satisfies client requirements. Testing can be used to find faults in the software and also find measures to improve the software in terms of efficiency, accuracy, usability, etc. During testing, verification may be performed to ensure that the software correctly implements a specific function or task. Meanwhile, validation may be performed to ensure that the software is aligned with the requirements of the design objectives. Manual testing requires a user to test the software without an automation (i.e., without a script). Here, the tester takes over the role of an end-user and tests the software to identify any unexpected behaviors/bugs. Meanwhile, automated testing (also referred to as test automation) is typically performed through the use of a script which automates the test process. Typically a developer or other test user writes a script and uses another software program to test the software based on the script.

Test automation must often cope with high complexity software processes, which leads to high costs and training effort, long ramp-up times, and poor code coverage. The reason for these drawbacks is because traditional automated tests are based on an external model of a test case (i.e., the script) which statically defines a sequence of events to control the application under test through an application programming interface (API) layer or a user interface layer. The scripting relies on the imperative programming paradigm which implements a static sequence of commands which are processed at run-time. In order to implement different test cases requires different external test scripts, which have to be created and/or maintained. As a result, testers must have significant programming skills and domain expertise of the application under test. Furthermore, the creation or maintenance of test programs for complex test cases is time-consuming and error-prone. This is also true for so-called "capture and replay" test tools, which simply record manual activities (usually on the user interface) of the application under test. Such tools also generate test programs, which have to be modularized, parameterized and maintained by the tester. Accordingly, a new paradigm for test automation which overcomes these drawbacks is needed.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2B is a diagram illustrating a process of retrieving events after a reference execution and recreating an auto test in accordance with an example embodiment.

Figure 1:
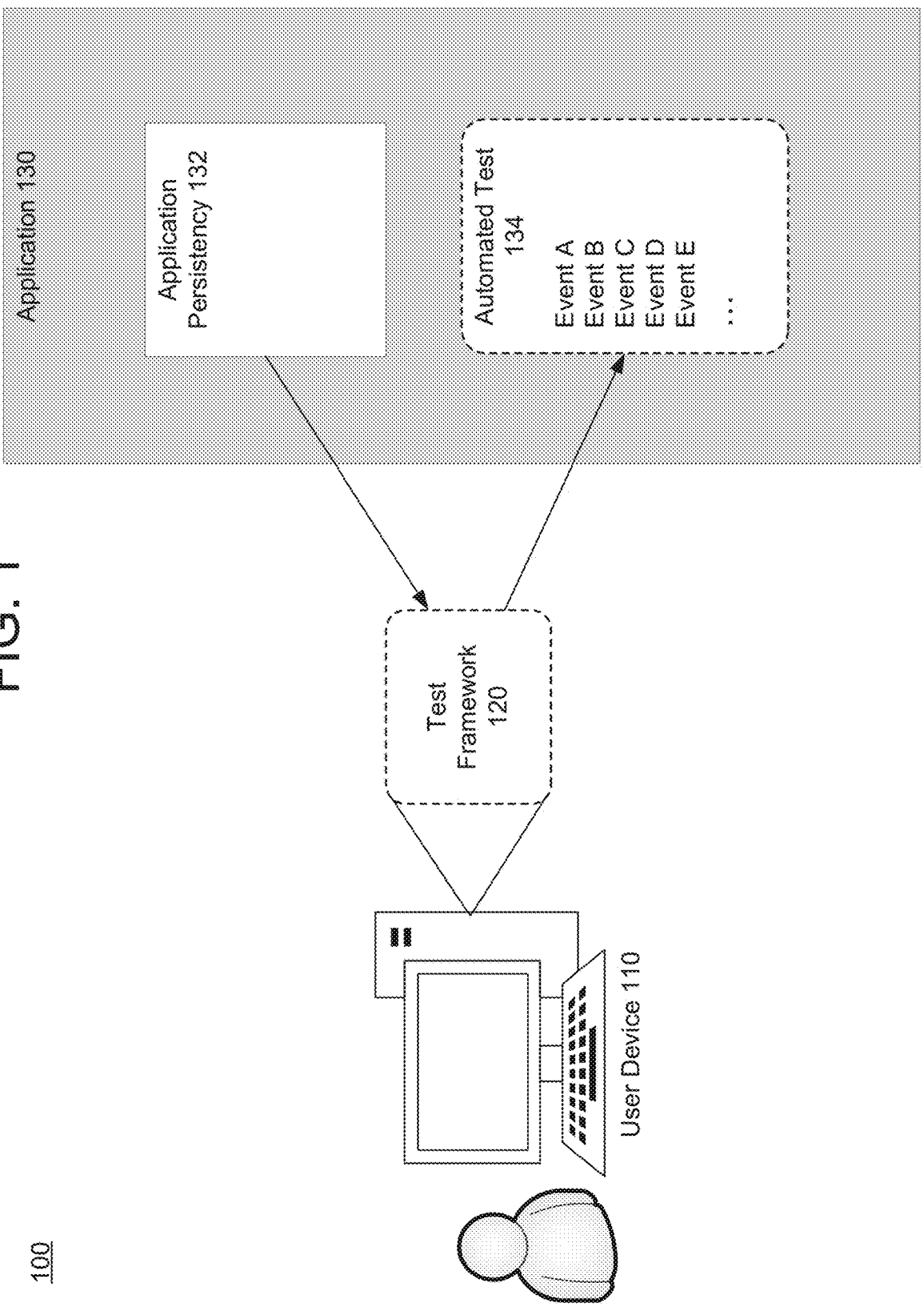
FIG. 1 is a diagram illustrating a test framework environment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Traditional software testing is often automated through the use of scripts. A script typically includes an external test program written by a developer or other user with programming knowledge. The design of the script is limited to a static sequence of commands which are executed to implement an external model that controls the application under test. In other words, traditional software tests externally "talk" to the application based on a script. For example, the script may control that application under test by calling an API or UI of the application and sending command to simulate a response. During development, an application is routinely modified/upgraded which likewise requires a test script to be modified/upgraded in order to properly test the modifications. However, modification of the test script requires a user to change the underlying script code or generate a new script. This demands that the tester have knowledge of programming and the application under test.

An example of a traditional automated test is a graphical user interface (GUI) capture and replay tool. A GUI-based capture and replay tool can test applications against graphical user interfaces. Using the capture and replay tool, testers can run the application and record the external interaction between a user and the application via a user interface. A script is recorded by the capture and replay tool with all user actions including mouse movements. The capture and replay tool often uses a "trace" that has to be switched on/off during runtime. A "trace" consists of callback routines (provided by the test framework) called by the application which pollute the application's code, but are needed to communicate with the test framework. Such a trace doesn't need timestamps, because the sequence of events is disclosed to the test framework during runtime. Further, the capture and replay tool can automatically replay the exact same interactive session via the user interface as captured by the trace.

However, the capture and replay tool records manual activities performed by a human, and is limited to user interface commands which externally trigger changes to an application. Furthermore, the capture and replay tool relies on a script (or static sequence of commands) which is limited in its implementation. Because of this, the capture and replay tool can be difficult to maintain, difficult if not impossible to reuse, and require data entered by a user that is difficult to code and hard to change, if needed. Furthermore, software applications tested via capture and replay are fragile because, often, a minor change in a graphical user interface, etc., can cause problems requiring the software and/or test script to be repaired manually.

The example embodiments are directed to an automated test framework which does not rely on a script or an external model controlled by a script. Instead, a new paradigm in test automation is introduced which enables a user to perform a manual reference test execution without any connection to a test framework during the application's runtime. Instead, the data model of the application allows at any later time to identify all data objects/events of the reference execution (e.g., test case execution) from the application's persistency which normally stores the application data. In one embodiments, the application may be configured to store the data with a certain ID field which already contains a timestamp field for each data object/event, in its own storage area. This is normal application data, no special data for testing purposes. It's just the required application data model which supports this new kind of testability.

After the runtime of the reference execution of the application has occurred/finished, a tester can request and start the test framework to create an auto test. For example, the user may enter the unique ID. The test framework may collect the data including timestamps from the applications storage area and copy it to its own storage area ("data container") thereby decoupling the application event data from the reference test. Here, the application data provides a snapshot of the determined state of the reference test case execution which may include input request, output request, processes, and the like. The test framework also allows for uploading the auto test to another system. After auto test creation, the auto test may be started using the data container. The data container may store timestamps and instantiation data enabling the system to automatically recreate the events in an appropriate order during a subsequent auto test thereby eliminating the need for an external test model controlled through a script.

Based on normal application information that is persisted during the reference run within an application persistency, a subsequent auto test of the application may be created and executed on the application based on the persisted events. Here, the application events may be ordered based on the timestamps and recreated based on the data persisted during the reference run thereby eliminating the need for a script. Furthermore, because the events (i.e., data input, data output, processes, etc.) are used to generate a dynamic internal test model during runtime of the automated test execution, there is no need for a static external model to be used to test the software program. Therefore, when the automated test is executed or triggered, application events may be retrieved from the data container of the automated test and added to an internal table of the test framework at runtime, sorted based on the timestamps, and executed. As a result, there is no script. Rather, during runtime the test framework sorts the events that originally occurred.

The application under test may be configured to be testable in a way which exceeds traditional testability. Architectural features may be implemented by (or within) the application under test. For example, application events relevant for a test may be persisted with a creation timestamp, and all persisted events belonging to a test case can be identifiable. In order to identify and read the application events, a developer may register application event types with the test framework during a registration period. During auto test creation, the test framework may identify and read the application event data from the application's persistency and copy it to a data container within a persistency of the test framework. The persisted application events may include data needed for recreating the application events and timestamps indicating when the events were created during the reference execution. Furthermore, in order to identify which events are commonly included in a test case, the events may be stored with a unique ID corresponding to the respective test case. The ID may subsequently be provided by a tester and used by the framework to retrieve the application events to be tested during a subsequent auto test.

Because the test framework generates an internal test for an application, a user (tester) does not need to create or maintain a test program for a particular test case. Instead, the user may simply perform an initial reference test (e.g., manually via user interface, etc.). If the user is satisfied with the results of the reference test, the user may turn from the manual reference test to the test automation framework for automating subsequent automated tests (or retests) based on the application events persisted in the application persistency during the reference test execution. The user or a particular test case may be assigned a unique identifier. When the reference test is executed, the events may be stored with a tag or marking of the unique identifier of the user and/or test case. When the user desires to create an auto test, the user may simply provide the unique identifier via a user interface to the test framework and the framework can retrieve all relevant events from application's persistency based on the unique identifier.

In response to a request including the unique identifier, all relevant events that occurred during this a reference test execution can be retrieved from the persistency. The identifier enables the test framework to collect data for recreating the events belonging to this reference test execution. All data retrieved from the persistency (including the respective creation timestamps) may be stored within a data container (e.g., XML container, etc.) which is under control of the test automation framework. When executing the automated test, the framework retrieves the events belonging to the test case from the data container. Based on the creation timestamps, the framework may reconstruct the original sequence of events that occurred during the reference test execution by sorting the events based on the timestamps. Furthermore, the internal test model can be created dynamically at runtime of the automated test execution. As the data container delivers all data necessary for event recreation, it is possible to perform an identical reproduction of the reference test execution automatically.

The test framework may be used to generate functional tests, and more particularly, functional integration tests as opposed to or in addition to unit tests. As will be appreciated, unit tests may be used by a developer to test a small piece of code (i.e., a unit) such as a method in a class to ensure that the particular piece of code performs a specific task. In contrast, a functional test may test a functionality of an application (e.g., with respect to a user, etc.) which can include testing many methods which may interact with one or more dependencies such as databases and web services. Functional testing may be used to ensure that the software is functioning as requested by a client, etc.

FIG. 1 illustrates a computing environment 100 for software testing in accordance with an example embodiment. In this example, the environment 100 includes a user device 110 which implements a test framework 120 for testing a software application 130. For example, the software application 130 may be executing on the user device 110. As another example, the user device 110 may be interacting with the application 130 via a network such as the Internet while the application 130 is hosted by another device such as a server (not shown). The test framework 120 may include one or more programs which interact with the application 130 under test. The test framework 120 may also include a library which stores commands for communicating with an interface (e.g., API) of the application 130 during testing. According to various embodiments, the application 130 may persist events that occur during a reference execution within the application persistency 132. Meanwhile, the test framework 120 may recreate an automated test 134 based on the events that are stored in the application persistency 132 for subsequent testing of the application 130.

During operation, a user of the user device 110 may execute a reference test or the initial test of the application 130. In some cases, the reference test may be a test which is performed by the user interacting with a user interface to control the application 130 under test. During the reference test, in this example, the application 130 may record normal application data within the application persistency 132. When performing the manual reference test execution of the application 130, there is no connection to the test framework (i.e. no detection of events) during the application's runtime. Instead, the data model of the application allows at any later time to identify all data objects/events of a test case execution on the application's persistency 132 which already contains a timestamp field for each data object/event, i.e. the application stores its data together with a timestamp in its own storage area. This is normal application data, no special data for testing purposes. However, the application data model may be configured to support the new kind of testability. For example, event types of the application 130 may be registered in advance with the test framework 120.

Subsequent to the reference test execution, a user may request the test framework 120 to generate an automated software test. In response, the test framework 120 may recreate a sequence of events (Event A, B, C, D, E, etc.) of the application 130 that occurred during the reference execution without an external test model (static definition of a sequence of events) needed to control the application 130 under test. Here, the test framework 120 is able to create an internal model (automated test 134) which is not exposed to the user (tester) and which is created after the runtime of the reference test. To create the automated test 134, event types of the application 130 may be registered with the test framework 120. Accordingly, events of pre-registered event types of the application 130 may retrieved by the framework 120 from the application persistency 132. The events are those events that occurred during the reference execution of the application 130 under test. Furthermore, the framework 120 may recreate the events internally based on an order identified from timestamps to recreate the automated test 134. Here, the events may be persisted in the application persistency 132 along with creation timestamps at which the events occurred thereby enabling the test framework 120 to retrieve and sort the events and recreate them in the order in which they occurred.

The script-less internal automated test 134 provides for significant simplification and reduction of complexity for test projects in comparison to scripted auto testing. Furthermore, any user with experience in the domain can be a tester (no development skills needed). Therefore, it is much easier to find appropriate testers. In addition, a test user can start to create an automated test immediately without any ramp-up time needed. Furthermore, test automation projects (during development, maintenance, or as part of implementation projects at the customer) receive a significant acceleration and cost reduction.

The framework described herein supports the transition from manual to automated testing. The distinctive feature compared to other test tools is that no external test model (test script) is needed. Instead, the framework may create an automated test out of a (usually manually performed) reference test, but not by capture/replay (recording of events using a trace which would also create a test script that has to be maintained). Instead, the framework retrieves events that previously occurred during a reference execution of an application from an application's persistency and recreates an order of the events based on timestamps to create the automated test. Therefore, no trace is needed. The event data may be collected after the reference test is finished, and the integration is realized solely via the persistency (database), with the advantage that there is no pollution of the productive code with test-related artifacts (e.g., trace calls, etc.)

Figure 2A:
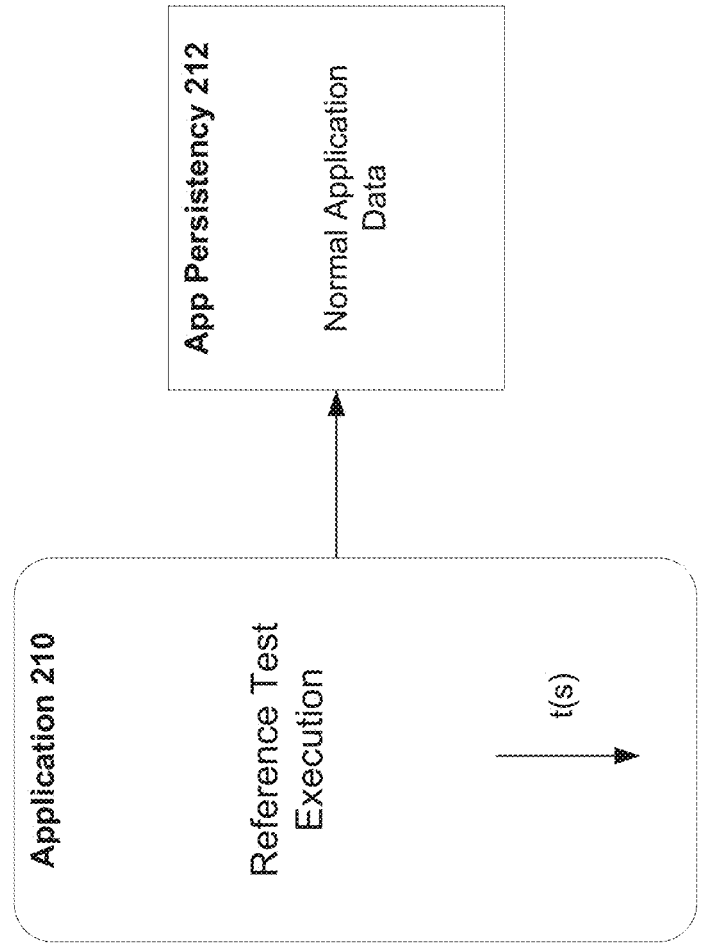
FIG. 2A is a diagram illustrating a process of storing events in an application persistency during a reference execution in accordance with an example embodiment.
Figure 2C:
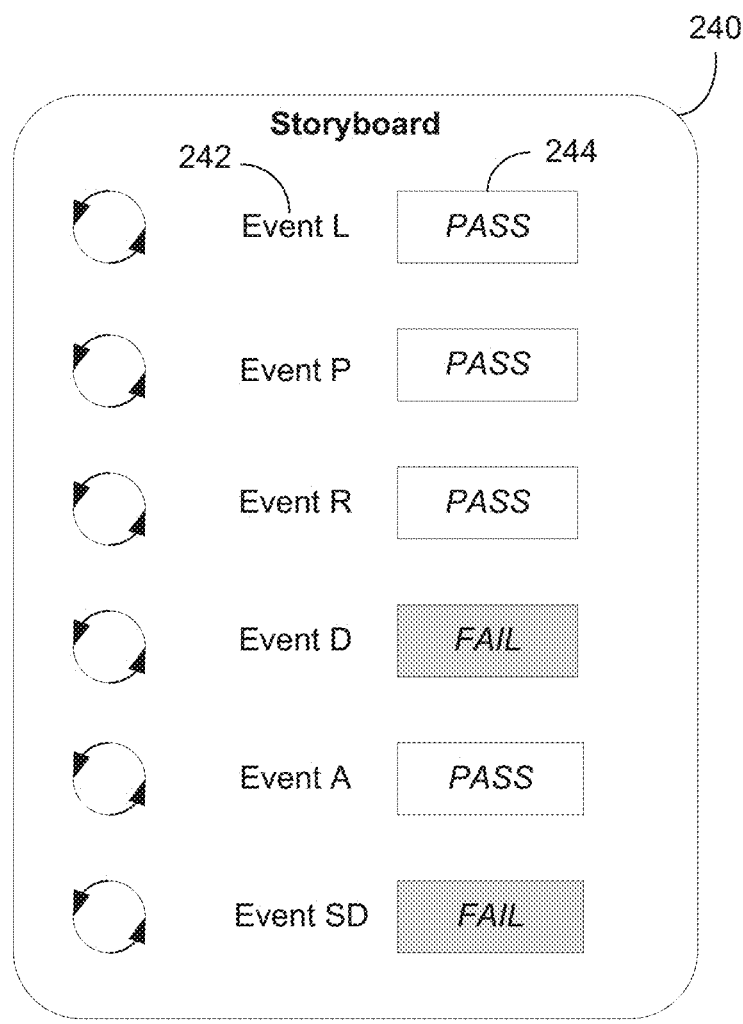
FIG. 2C is a diagram illustrating a user interface outputting pass/fail results of an auto test in accordance with an example embodiment.

FIG. 2A illustrates a process 200A of storing events in an application persistency during a reference execution in accordance with an example embodiment, FIG. 2B illustrates a process 200B of retrieving events after a reference execution and recreating an auto test in accordance with an example embodiment, and FIG. 2C illustrates a user interface 240 displaying results of the auto test in accordance with an example embodiment.

Referring to FIG. 2A, an application 210 may be executed during an initial run or a reference run in which a plurality of events occur internally within the application 210. The event data may be stored within an application persistency 212 which is a persistency of the application and independent of a test framework. Examples of internal application event types that might be tested include, but are not limited to, the input of data into a process that can include input entities subject to processing by the application 210, process entities representing information about certain process executions (start time, parameters etc.) of the application 210 which produce the desired output entities, output entities that are created by process entities and are subject to comparison (output entities of a reference test execution serve as expected data, output entities of an automated test execution serve as actual data), and the like. The tester may perform the reference test case manually on the application 210 and verify the results.

Referring to FIG. 2B, a test framework may receive a request to recreate an automated test of the reference test. In this case, a user may submit a request via a user interface, etc. The request may include a unique ID associated with the reference test, the user, the application, etc. In response, the test framework may retrieve event data from the application persistency 212 and store the event data in a data container 220 of the test framework. Here, the events of the application 210 that occur during the reference test case may be retrieved (e.g., based on the unique ID) by the test framework and stored within a storage of the test framework such as the data container 220. By moving the event data from the application persistency 212 to the data container 220, the test framework and the application are decoupled enabling the auto test to be executed by another system, if desired.

Each event may be stored as an object 222 within the data container 220 and may include an identification of the event, data for recreating the event, a creation timestamp of the event, and a unique ID associated with one or more of the application, the test, the user, etc. As a non-limiting example, the data container 220 may be an eXtensible Markup Language (XML) container, but is not limited thereto. The data container 220 may be filled after the reference test has been performed based on events associated with the unique ID rather than requiring a trace. Furthermore, the timestamps may provide an indicator of when each event occurred with respect to each other, thereby preventing the need for a script. Accordingly the test framework may successfully recreate the events in the order they are detected. Here, the framework captures a snapshot of the events as they have occurred during the reference test from the application persistency 212.

The user may also provide a unique ID or may be assigned a unique ID during registration with the framework. Here, the user may label a reference test with the unique ID. As a non-limiting example, the unique ID may be associated with the user, a test case, a device, an application, or the like. During the execution of the reference test, the application 210 may store information about each event of the application with the unique ID in the application persistency 212 thereby enabling the events to be subsequently linked together as belonging to a common test case. Here, the unique ID is 1234. The data container 220 may be an object or other container where data can be combined with objects of other events. Therefore, the unique ID helps to distinguish and identify events from a current test case with respect to other data that may be included in the data container 220.

In the example of FIG. 2B, the test user may request recreation of an automated test by providing the framework with the unique ID. In response, the framework may read the event objects 222 labeled with the unique ID from the data container 220, recreate an order of the events as shown in table 230 in sequence based on the data and the timestamps, and execute the recreated events in an automated manner to perform an auto test based on the previous reference test. Referring now to FIG. 2C, the results of the auto test may be output to a graphical user interface 240 (also referred to as a storyboard) which identifies each event 242 and a status 244 of each event of the application that was tested by the recreated auto test. As a non-limiting example, the events may be labeled as pass or fail within the user interface 240. As another example, the events may be labeled with colors instead of words, such as green for pass and red for fail. The example shown in FIG. 2C should not be construed as limiting.

When performing the auto test, the framework may create runtime instances of all entities in the respective data container 220 and puts these instances into an internal (runtime) table represented by 230. Here, the events may be ordered or otherwise stored within the internal table by the timestamp in order to reconstruct the original sequence of events from the reference test. Furthermore, the storyboard 240 which shows the statuses of each. The sequence of events may be determined at runtime of the automated test execution. Accordingly, there is no need for a static definition (i.e., a script) anymore. In this example, the test framework may include a test program or group of programs which create runtime instances of the objects based on recreation data stored with the events in the data container 220, and put the recreated instances into the internal table 230. The test program may sort the events within the table 230 based on the creation timestamps to achieve a same sequence of events as in the reference test. The framework may also trigger an auto test of the application. Here, the framework may read test output by event, and creation timestamp prior to run of the next event in the sequence and indicate whether the event passed or failed via the user interface 240.

Figure 3:
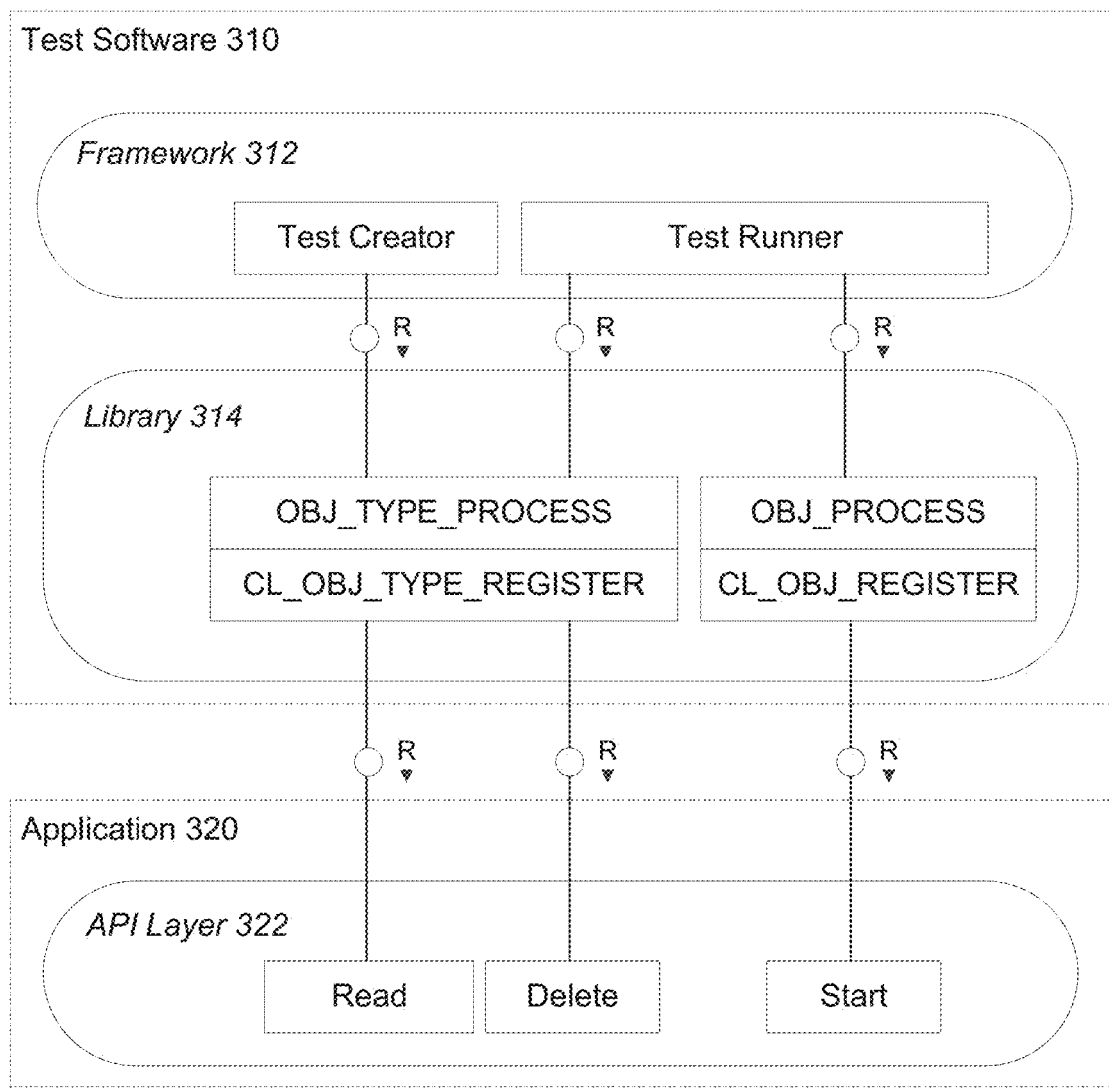
FIG. 3 is a diagram illustrating an architecture of a connector library for recreating an application event in accordance with example embodiment.

FIG. 3 illustrates an architecture 300 of a connector library 314 for recreating an application event in accordance with example embodiment. Here, the connector library 314 may be an application-specific connector library that is used to connect a test framework 312 (test programs) to an application programming interface (API) 322 of an application 320 thereby enabling the test framework 312 to interact with and control processes of the application 320. In some embodiments, multiple registered event types (event types in table 1 below) may share the same technical requirements (class). In the example of FIG. 3, an application event corresponds to a process named "register" in which a registration process is executed by the software application 320. However, it should be appreciated that the event may be a different event type such as an input event type, process event type, etc.

As shown in the example of FIG. 3, the application 320 under test is connected to the test framework 312 of a test software 310 via a connector library 314 which may also be part of the test software 310. This library 314 may be an application-specific API layer for the test framework 312. If an application wants to be tested through the test framework 312, all relevant event entities may use an implementation of certain interfaces, depending on the classification (input, process, output, etc.). Inside these implementing classes, the API-layer of the application 320 under test is called.

Every test tool needs an application-specific connector library 314 in order to control the application 320 under test. One of the differences with test framework 312 and traditional test software is that this library 314 is not exposed to the tester while creating tests. Furthermore, an implementing class for one or more data object types or event types may be declared in a configuration table. Below is an example (Table 1) with event entities of an application being provided.

TABLE 1

| ENTITY TYPE | IMPLEMENTING CLASS | CLASSIFICATION |
|---|---|---|
| payment | cl_obj_type_payment | input |
| loan | cl_obj_type_loan | input |
| register_process | cl_obj_type_register | process |
| subledger_document | cl_obj_type_document | output |

In the table shown above, the column "classification" allows the test framework 312 to assign implementing classes to a respective generic interface. In this example, a distinction between "output" and "process" allows the framework 312 to identify the actual output which is needed for a comparison with the expected output. For example, if a currently processed event is classified as output, the framework 312 determines the preceding, etc.

When executing the software test 310 including the test framework 312, the implementing classes for each entity type may trigger the framework 312 to create a runtime instance for each single entity which are then inserted in the storyboard (240 shown in FIG. 2). When looping over the storyboard and creating the respective events (performing the actions), these events may be stored for monitoring reasons in a test run table. The distinction between "output" and "process" allows the framework 312 to identify the actual output which is needed for a comparison with the expected output. For example, if the currently processed event of the storyboard is classified as output, the framework 312 may determine the preceding step classified as "process" which represents the last process execution and gets the start timestamp of it, which serves as the lower limit of the creation timestamp when selecting the actual output.

Figure 4:
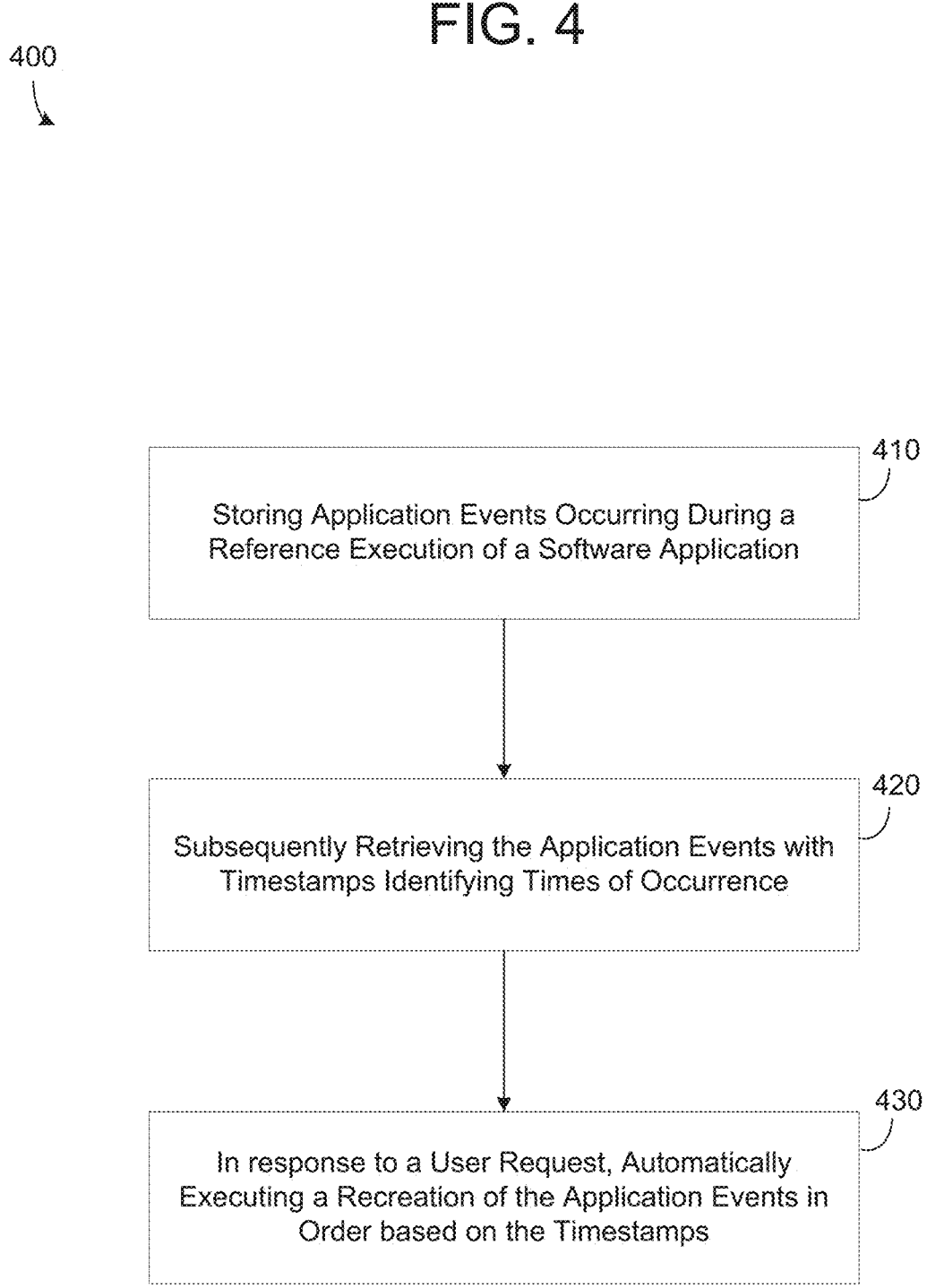
FIG. 4 is a diagram illustrating a method for generating and executing a test automation without a script in accordance with an example embodiment.

FIG. 4 illustrates a method 400 for generating and executing a test automation without a script in accordance with an example embodiment. As an example, the method 400 may be performed by a computing device such as a user device, a personal computer, a tablet, a server, a database, a cloud platform, a combination of devices, and the like. Referring to FIG. 4, in 410, the method may include storing, via an application persistency, a plurality of application events that occur during a reference execution of an application. The events may include one or more of input events, output events, and process events, performed internally by the application during the reference test. The application may be executed during a reference test and may create application data which is stored in a persistency of the application. Here, the application persistency may be decoupled from a test framework.

According to various embodiments, in 420 the method may include retrieving the plurality of application events of the reference execution of the application and timestamps indicating respective times when the plurality of application events occurred, from the application persistency. For example, the retrieving may be performed at periodic intervals, automatically, in response to a test request from the user, and the like. Furthermore, in response to receiving a test request from the user, in 430 the method may include executing a recreation of the plurality of application events in an order based on the timestamps to perform an automated test of the application. Here, the executing of the recreation of the persisted plurality of application events may be performed by a test framework without using a script or a trace to perform the automated test of the application.

The test framework may communicate with the application's persistency to retrieve the events and the timestamps for recreating an auto test. In some embodiments, the retrieving may include reading the timestamps and data for re-instantiating the plurality of application events from the application persistency and storing the timestamps and the data within a data container of a test framework. For example, the reading of the timestamps and the data for re-instantiating the plurality of application events from the application persistency is performed after the reference execution of the application is completed.

In some embodiments, the executing may further include arranging the plurality of application events within an internal table of a test framework based on the timestamps to correspond to a sequence in which the application events occurred during the reference execution of the application. In some embodiments, the method may further include identifying pass/fail statuses of the plurality of application events, respectively, during the automated test, and outputting the identified pass/fail statuses via a user interface. In some embodiments, the retrieving may include retrieving the plurality of application events from the application persistency based on a unique ID associated with a test case of the application under test, and the executing of the recreation of the application events in response to the request identifying the unique ID.

Figure 5:
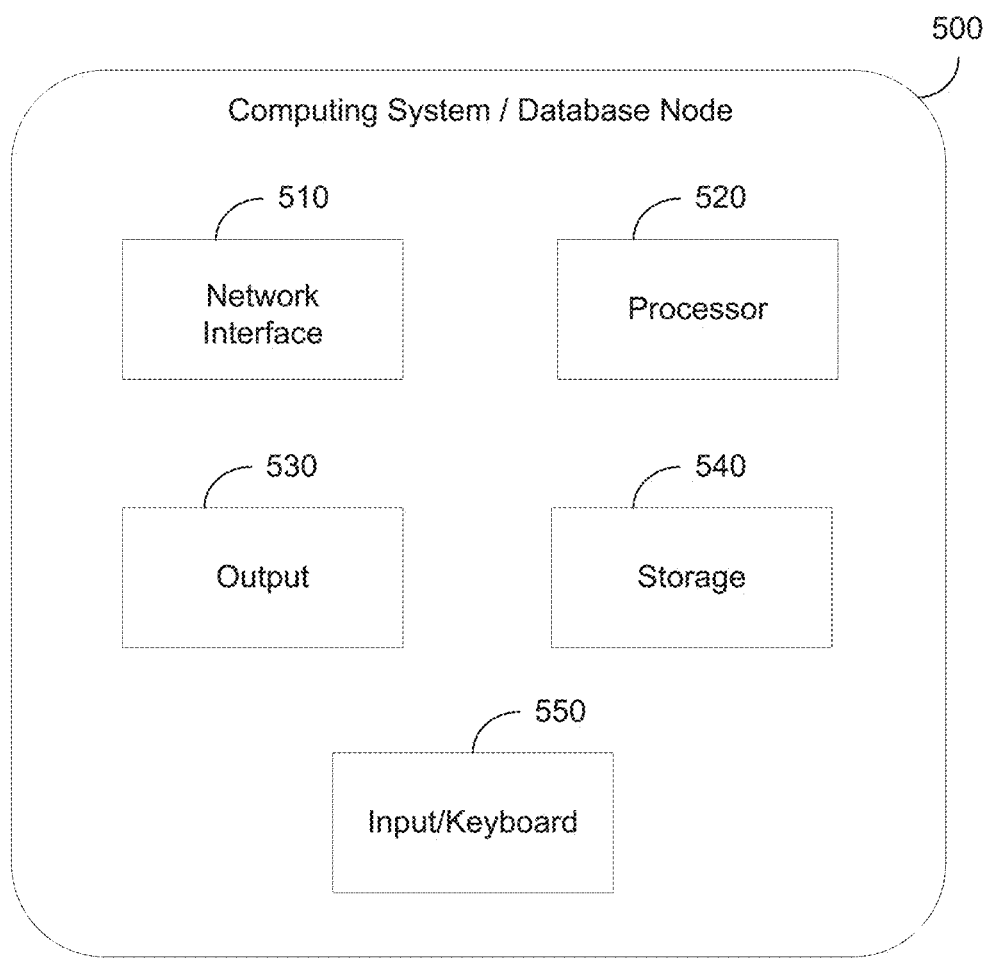
FIG. 5 is a diagram illustrating a computing system in accordance with an example embodiment.

FIG. 5 illustrates a computing system 500 that may be used in any of the embodiments described herein, in accordance with an example embodiment. For example, the computing system 500 may be a user device (e.g., personal computer, laptop, tablet, mobile phone, smart-wearable devices, etc.), a server, a workstation, an appliance, or the like. In some embodiments, the computing system 500 may be distributed across multiple devices. Referring to FIG. 5, the computing system 500 includes a network interface 510, a processor 520, an output 530, a storage device 540 such as an in-memory, and an input unit 550 which may include a keyboard (mechanical, virtual, etc.), and the like. Although not shown in FIG. 5, the computing system 500 may also include or be electronically connected to other components such as a display, a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the computing system 500, an externally connected display, a display connected to the cloud, another device, and the like. For example, the output 530 may include a port, an interface, a cable, a wire, a board, and/or the like, with input/output capabilities. The network interface 510, the output 530, or a combination thereof, may interact with applications executing on other devices.

The storage device 540 is not limited to a particular storage device and may include any known memory device such as RAM, ROM, hard disk, and the like, and may or may not be included within the cloud environment. The storage 540 may store software modules or other instructions which can be executed by the processor 520 to perform the method shown in FIG. 4. According to various embodiments, the storage 540 may store database files and may have a partitioning scheme as shown or described in the examples herein. The storage 540 may include a data store having a plurality of tables, partitions and sub-partitions. The keyboard 550 may receive key presses (in the case of a mechanical keyboard) or detect key presses (in the case of a virtual keyboard). Through the keyboard 550 a user may create a key press that corresponds to a shortcut which instructions the computer to perform a command such as save, delete, open, cut, paste, refresh, and the like.

According to various embodiments, the storage 540 may include an application persistency (e.g., database, data store, etc.) which stores a plurality of application events that occur internally during a reference execution of an application under test. Events may include normal application data such as input, output, and processes which receive input and/or create output. The processor 520 may persist the plurality of application events along with timestamps indicating respective creations times at which the plurality of application events occurred, in the storage 540. In addition, the processor 520 may also store a unique ID associated with the test case, user, etc., identifying the events as being associated with the unique ID. Furthermore, the processor 520 may store data for recreating and/or re-instantiating the events during a subsequent auto test.

In response to a request to test the application, the processor 520 may retrieve the plurality of application events of the reference execution of the application and timestamps indicating respective times when the plurality of application events occurred, from the application persistency, and execute a recreation of the plurality of application events in an order based on the timestamps to perform an automated test of the application. According to various embodiments, the processor 520 may execute the recreation of the persisted plurality of application events without using a script to perform the automated test of the application.

In some embodiments, the processor 520 may extract the application events from an application storage and store the application events in a data container of a test framework thereby decoupling the reference execution with the test framework enabling the test framework to be implemented via a different system, if desired. For example, the processor 520 may read the timestamps and data for re-instantiating the plurality of application events from the application persistency and store the timestamps and the data within a data container of a test framework. Here, the processor 520 may read the timestamps and the data for re-instantiating the plurality of application events from the application persistency after the reference execution of the application is completed. In other words, the application events may be subsequently retrieved from a normal application persistency rather than relying on a trace function which occurs during a reference execution.

In some embodiments, the processor 520 may arrange the plurality of application events within an internal table of a test framework based on the timestamps to correspond to a sequence in which the application events occurred during the reference execution of the application. In some embodiments, the processor 520 may identify pass/fail statuses of the plurality of application events, respectively, during the automated test, and output the identified pass/fail statuses via a user interface. In some embodiments, the processor 520 may retrieve the plurality of application events from the application persistency based on a unique ID associated with a test case of the application under test, and execute the recreation of the application events in response to the request identifying the unique ID.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a processor configured to
        receive a request to execute a test recreation for a software application,
        extract, via a test software, a plurality of application events of the software application which include one or more of internal process input events, internal process output events, and internal process execution events and timestamps of the plurality of application events which are recorded within a persistency of the software application during a reference execution and store the plurality of application events and timestamps in a data container of the test software,
        dynamically create runtime instances of the plurality of application events within the data container of the test software based on identifiers of implementing classes of the plurality of application events of the software application declared in a configuration table and order the dynamically created runtime instances based on the timestamps of the plurality of application events, wherein the configuration table contains a classification field and an implementing class field,
        establish a connection between an application programming interface (API) of the test software to an API of the software application, and
        submit commands of an application library included within the API of the test software to the API of the software application via the established connection based on the identifiers of the implementing classes, where the commands control the software application to internally execute a test recreation based on the dynamically created and ordered runtime instances of the plurality of application events in the data container of the test software.

2. The computing system of claim 1, wherein the processor is configured to execute the test recreation of the plurality of application events without using a script.

3. The computing system of claim 1, wherein the processor is configured to read the timestamps and data for re-instantiating the plurality of application events from the persistency based on a command from the application library included within the API of the test software and store the timestamps and the data within the data container of the test software that is decoupled from the persistency.

4. The computing system of claim 3, wherein the processor is configured to read the timestamps and the data for re-instantiating the plurality of application events from the persistency after the reference execution of the application is completed.

5. The computing system of claim 1, wherein the processor is further configured to identify pass/fail statuses of the plurality of application events, respectively, during an automated test, and output the identified pass/fail statuses via a user interface.

6. The computing system of claim 1, wherein the processor is configured to receive, via the request, a unique test case identifier previously assigned to the reference execution, and extract the plurality of application events from the persistency which are each assigned the unique test case identifier.

7. A method comprising:
receiving a request to execute a test recreation for a software application;
extracting, via a test software, a plurality of application events of the software application which include one or more of internal process input events, internal process output events, and internal process execution events and timestamps of the plurality of application events which are recorded internally within a persistency of the software application during a reference execution and storing the plurality of application events and timestamps in a data container of the test software;
dynamically creating runtime instances of the plurality of application events within the data container of the test software based on identifiers of implementing classes of the plurality of application events of the software application declared in a configuration table and ordering the dynamically created runtime instances based on the timestamps of the plurality of application events, wherein the configuration table contains a classification field and an implementing class field; and
establishing a connection between an application programming interface (API) of the test software to an API of the software application and submitting commands of an application library included within the API of the test software to the API of the software application via the established connection based on the identifiers of the implementing classes, where the commands control the software application to internally execute a test recreation based on the dynamically created and ordered runtime instances of the plurality of application events in the data container of the test software.

8. The method of claim 7, wherein the executing of the test recreation of the plurality of application events is performed without using a script.

9. The method of claim 7, wherein the retrieving comprises reading the timestamps and data for re-instantiating the plurality of application events from the persistency based on a command from the application library included within the API of the test software and storing the timestamps and the data within the data container of the test software that is decoupled from the persistency.

10. The method of claim 9, wherein the reading of the timestamps and the data for re-instantiating the plurality of application events from the persistency is performed after the reference execution of the application is completed.

11. The method of claim 7, further comprising identifying pass/fail statuses of the plurality of application events, respectively, during an automated test, and outputting the identified pass/fail statuses via a user interface.

12. The method of claim 7, wherein the receiving comprises receiving, via the request, a unique test case identifier previously assigned to the reference execution, and the extracting comprises extracting the plurality of application events from the persistency which are each assigned the unique test case identifier.

13. A non-transitory computer readable storage medium comprising program instructions that when executed cause a computer to perform a method comprising:
receiving a request to execute a test recreation for a software application;
extracting, via a test software, a plurality of application events of the software application which include one or more of internal process input events, internal process output events, and internal process execution events and timestamps of the plurality of application events which are recorded internally within a persistency of the software application during a reference execution and storing the plurality of application events and timestamps in a data container of the test software;
dynamically creating runtime instances of the plurality of application events within the data container of the test software based on identifiers of implementing classes of the plurality of application events of the software application declared in a configuration table and ordering the dynamically created runtime instances based on the timestamps of the plurality of application events, wherein the configuration table contains a classification field and an implementing class field; and
establishing a connection between an application programming interface (API) of the test software to an API of the software application and submitting commands of an application library included within the API of the test software to the API of the software application via the established connection based on the identifiers of the implementing classes, where the commands control the software application to internally execute a test recreation based on the dynamically created and ordered runtime instances of the plurality of application events in the data container of the test software.

14. The non-transitory computer readable storage medium of claim 13, wherein the executing of the test recreation of the plurality of application events is performed without using a script.

15. The non-transitory computer readable storage medium of claim 13, wherein the retrieving comprises reading the timestamps and data for re-instantiating the plurality of application events from the persistency based on a command from the application library included within the API of the test software and storing the timestamps and the data within the data container of the test software that is decoupled from the persistency.

16. The computing system of claim 1, wherein the plurality of application events comprise identifiers of a plurality of processing events performed internally by the software application which are recorded in the persistency.

17. The computing system of claim 1, wherein the processor is configured to transmit an API call from the application library of the test software to an implementing class of the software application via the established connection to when executing the test recreation.

* * * * *